United States Patent [19]

Imrie

[11] 3,856,625
[45] Dec. 24, 1974

[54] PROCESS FOR THE PRODUCTION OF POLYSACCHARIDE

[75] Inventor: Frazer Keith Elliott Imrie, Wallington, England

[73] Assignee: Tate & Lyle Limited, London, England

[22] Filed: May 29, 1973

[21] Appl. No.: 364,254

[52] U.S. Cl. .................................. 195/31 P, 195/96
[51] Int. Cl. ............................................. C12b 1/00
[58] Field of Search ...................... 195/31 D, 96, 80

[56] References Cited
OTHER PUBLICATIONS

Chem. Abstracts, 75:1648c.
Chem. Abstracts, 66:83283f.
Chem. Abstracts, 61:6068d.

*Primary Examiner*—A. Louis Monacell
*Assistant Examiner*—Thomas G. Wiseman
*Attorney, Agent, or Firm*—Ostrolenk, Faber, Gerb & Soffen

[57] ABSTRACT

An alginate-type polysaccharide is obtained by the aerobic cultivation of a bacterium of the species *Azotobacter vinelandii* in an aqueous nutrient medium containing sources of carbon, molybdenum, iron, mangesium, potassium, sodium, sulfate, calcium and phosphate. The carbon source comprises at least one monosaccharide or disaccharide. Contrary to normal culture conditions for this bacterium, for good polysaccharide production, the phosphate concentration in the nutrient medium must be 0.1–0.8 millimolar, preferably 0.2–0.6 millimolar; and the pH of the medium must be maintained within the range of from 7.0 to 8.2, preferably 7.3 to 7.9.

10 Claims, 2 Drawing Figures

PROCESS FOR THE PRODUCTION OF POLYSACCHARIDE

This invention relates to a process for the production of polysaccharide. More particularly, the invention relates to the production of an alginate-type polysaccharide by the cultivation of bacteria of the species *Azotobacter vinelandii*.

Alginic acid, a hydrophilic colloidal carbohydrate acid, is a variable block copolymer composed of d-mannuronic and l-guluronic acid units. Although alginic acid itself is practically insoluble in water, it can readily be solubilized by neutralization with a suitable alkali. One of the outstanding characteristics of alginate solutions is their high viscosity at very low concentrations; and when certain divalent ions, such as calcium or magnesium, are added to solutions of alginate, gelatin is induced. The unique physical properties of alginic acid and alginates give them a wide range of industrial applications as emulsifiers, stabilizers and thickeners. For example, in the food industry, they can be used as emulsion stabilizers for ice-cream, as gelling agents for milk puddings, as thickeners for sauces, and as foam stabilizers for beer; in pharmaceuticals, they can be used as emulsifiers and thickeners for surgical soaps and lotions, as disintegrating and granulating agents for tablets, as suspending agents for ointments, and as absorbable gels for surgical dressings; in paper and textile processing, they can be used in sizing, coating, finishing, dyeing and printing compositions; and, in agriculture, they can be used as soil conditioners.

Heretofore, alginic acid and alginates have been obtained on a commercial scale solely by extraction from certain species of brown seaweed, for example *Laminaria digitata* and *Ascophyllum nodosum*, in which they make up a large proportion of the cell walls. In the industrial process, wet or dried seaweed is first milled and washed, followed by treatment with sodium carbonate, to give crude sodium alginate. Calcium chloride solution is then added and the precipitated calcium alginate leached with acid to remove calcium ions. An approximately equimolar amount of solid sodium carbonate is added, and the semi-solid mixture pulverized until a paste of sodium alginate is obtained. Finally, this paste is dried and milled, to produce a powdered product. This process is fairly crude and produces an impure product, although a purer product can be obtained by alcohol precipitation. The harsh conditions of extraction and processing tend to introduce color and degrade the product. Solid impurities, such as cell wall debris and sand particles, are not fully removed, and a certain amount of odor is often present.

This conventional process suffers from the disadvantage of being dependent on a supply of alginate-containing seaweed as starting material. It is awkward to carry out because of the quantities of seaweed involved; and considerable further purification may be necessary, especially if a food or pharmaceutical grade material is required. These difficulties have tended to limit the full exploitation of alginates. Accordingly, there is a need for a new, simple process whereby alginates can be produced on an industrial scale, at the required level of purity from inexpensive and readily available starting materials.

It is known that several species of *Azotobacter* are capable of producing exocellular polysaccharides. In particular, it has been shown that *Azotobacter vinelandii* produces a polysaccharide which is structurally similar to alginic acid obtained from seaweed except for being partially acetylated. The biosynthesis of this alginate-like polysaccharide is described by P. A. J. Gorin and J. F. T. Spencer in Canadian Journal of Chemistry, 44 (1966) 993–998, and by B. Larsen and A. Haug in Carbohydrate Research, 17 (1971) 287–296. However, although the production of this polysaccharide has been demonstrated in the laboratory, until now no process has been proposed which would enable it to be produced with acceptably high yields on a commercial scale.

SUMMARY OF THE INVENTION

It is an object of this invention to provide a new process for the production of alginate-like polysaccharide which avoids the disadvantages of using seaweed as starting material. Another object is to provide a process for the microbial production of alginate-like polysaccharide which is practicable on a commercial scale and uses readiliy available materials. A further object is to make possible the production of high yields of polysaccharide by the cultivation of *Azotobacter vinelandii*. These and other objects will become apparent from the following description of the invention.

Surprisingly, I have now discovered that these objects can be achieved, whereby the yield of alginate-like polysaccharide is greatly increased and a commercial-scale process becomes possible, if *Azotobacter vinelandii* is grown under culture conditions which differ significantly from those which were always previously employed for this micro-organism. Specifically, I have found that the polysaccharide yield can be increased by about four times if the phosphate concentration in the culture medium is reduced to about one-tenth of that conventionally used and if the pH of the medium is controlled within certain limits. These findings are completely unexpected and run counter to the teachings of the prior art.

In accordance with my invention, polysaccharide is produced by a process which comprises the steps of:

a. inoculating an aqueous final culture medium with a bacterium of the species *Azotobacter vinelandii*, said medium having a pH in the range of from about 7.0 to about 8.2 and containing as essential ingredients at least one carbon source selected from the group consisting of monosaccharides and disaccharides, at least one phosphate source in an amount such that the concentration of phosphate in the medium is in the range of from about 0.1 to about 0.8 millimolar, and sources of molybdenum, iron, magnesium, potassium, sodium, calcium and sulfate;

b. cultivating said bacterium in said medium under aerobic conditions, while maintaining the pH of the medium within the range of from about 7.0 to about 8.2, until a substantial formation of polysaccharide has occurred; and c. recovering a polysaccharide-containing culture broth.

DESCRIPTION OF THE PREFERRED EMBODIMENTS OF THE INVENTION

Figure 1:
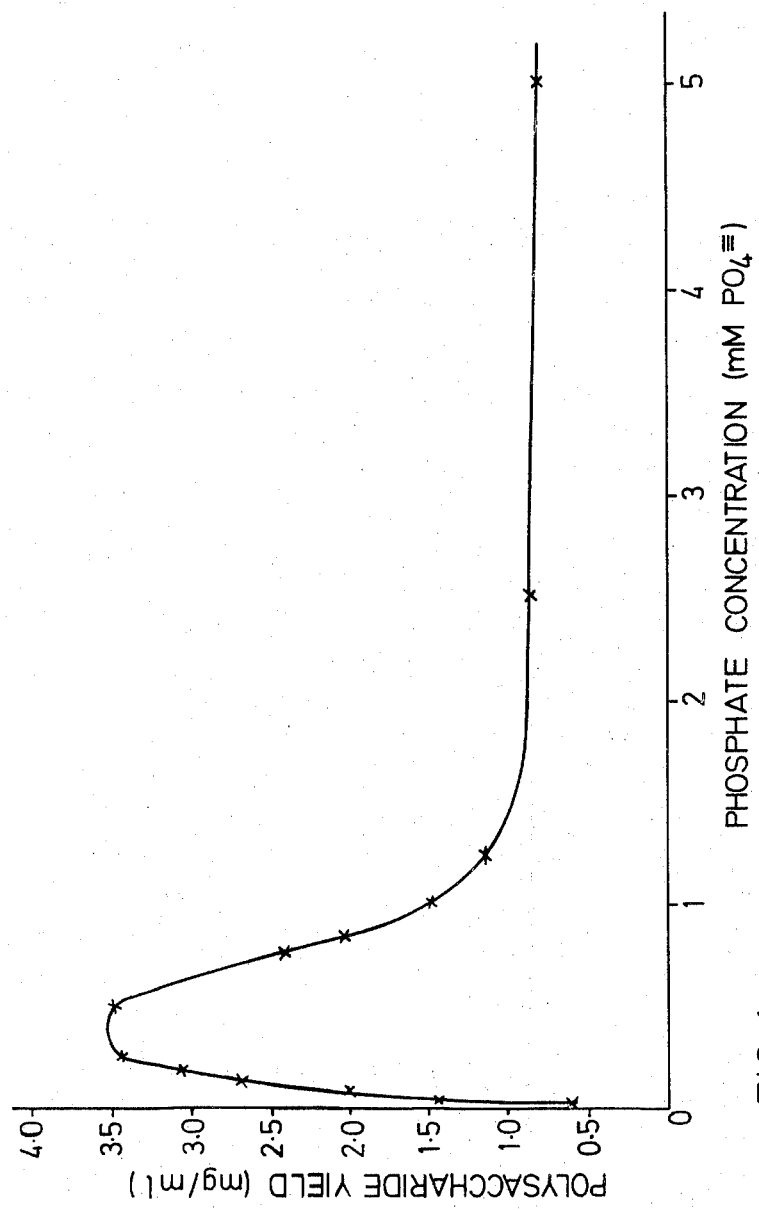

Any strain of *Azotobacter vinelandii* can be used in the process of the present invention. However, a particularly valuable strain which gives especially good yields of the polysaccharide is that bearing the culture collection numbers NCIB 9068 and NCIB 8789. Another strain that can be used bears the culture collection number NCIB 8660. These strains are available unconditionally from the National Collection of Industrial Bacteria, Torry Research Station, P.O. Box 31, 135 Abbey Road, Aberdeen, Scotland, Great Britain, and are described in the catalog of the collection.

A critical feature in the production of high polysaccharide yields by the process of the invention is the phosphate concentration in the culture medium. It has been found that the best yields of polysaccharide are obtained when operating at a phosphate concentration of about 0.1 – 0.8 millimolar, preferably about 0.2 – 0.6 millimolar, and most preferably at about 0.4 millimolar. This contrasts markedly with the culture media which have, until now, been thought to provide the optimum growth conditions for Azotobacter vinelandii and which contain a phosphate concentration of about 5 millimolar or higher. For example, in their above-cited work on Azotobacter vinelandii, Gorin and Spencer used Burk's medium, which is the most widely employed conventional phosphate level of about 5 mM. Similarly, Larsen and Haug employed basal media having a phosphate concentration of about 6 mM. The high phosphate concentrations of these conventional media do not produce high polysaccharide yields.

The phosphate can be provided in the culture medium in the conventional manner, by means of soluble phosphate salts such as $K_2HPO_4$ and $KH_2PO_4$.

Another critical factor in the successful performance of the invention is the maintenance of the culture medium at the correct pH level. Unless steps are taken to prevent it, the pH of the culture medium falls as the cultiviation of the micro-organism progresses, due to the formation of the polysaccharide and other acidic products. Heretofore, the pH of the culture medium has not been controlled during the cultivation of Azotobacter vinelandii: for example, although the pH of the conventionally used Burk's medium is about 7.4 when inoculated with the micro-organism, it will normally have fallen to about 5.5 by the end of cultivation. It has now been discovered that, by maintaining the pH of the culture medium within the range of from about 7.0 to about 8.2 throughout cultivation, the utilization of the culture medium, especially of the carbon source, is markedly improved and a substantially higher yield of polysaccharide is obtained. The pH of the culture medium is preferably maintained within the range of from aabout 7.3 to about 7.9 throughout cultivation, and most preferably at about 7.5.

The pH of the culture medium may be controlled by any means which do not adversely affect the cultivation of the micro-organism. For example, a measured amount of an alkaline reagent, such as sodium hydroxide solution, can be added intermittently to the medium as required; and this may be performed automatically by a reagent metering device connected to pH measuring means in the culture medium. Alternatively, the pH can be controlled by adding an appropriate buffer to the medium, for example tris(hydroxymethyl)-aminomethane buffer.

Figure 2:
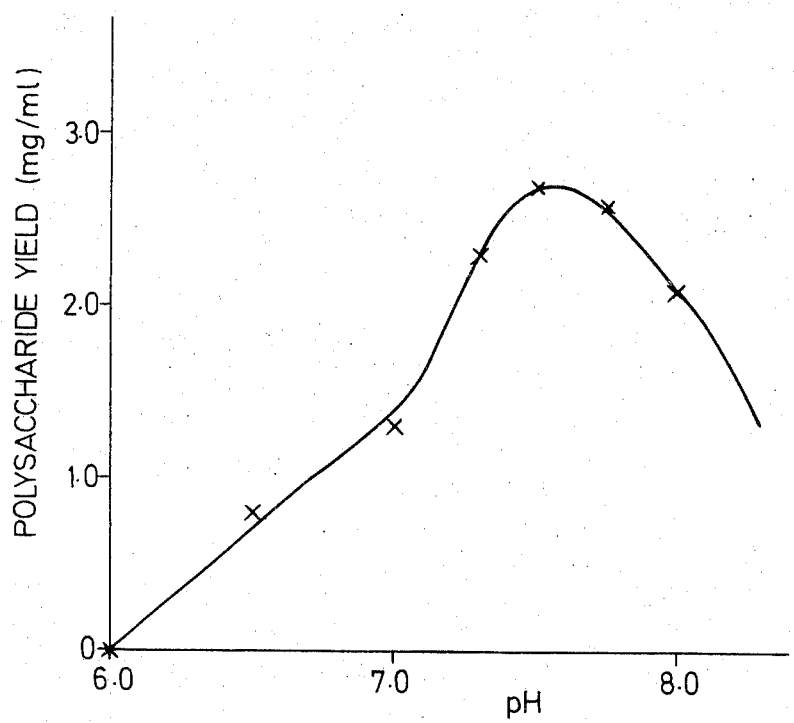

The accompanying drawings illustrate the effect of phosphate concentration and pH on polysaccharide production. In the drawings:

FIG. 1 is a graph showing the effect of the phosphate concentration in the culture medium on the polysaccharide yield; and FIG. 2 is a graph showing the effect of the pH of the culture medium on polysaccharide yield. The manner in which these measurements were made is described hereinafter in the Examples. These graphs clearly demonstrate the benefits arising from operating in accordance with the teachings of the present invention as opposed to those of the prior art.

The cultivation of the micro-organism is performed under aerobic conditions. Azotobacter vinelandii has an extremely high respiration rate. Consequently, any limit on the amount of oxygen supplied to the culture medium will be imposed by practical considerations, such as the design of the fermenter and associated equipment, rather than by the requirements of the micro-organism. It has been found that good results can be obtained with oxygen solution rates from about 5 to about 50, preferably about 8 to about 20, millimoles of oxygen per litre of medium per hour, although aeration rates outside these ranges can also be used. Air is normally used as the oxygen source, because Azotobacter vinelandii is a nitrogen-fixing micro-organism and can therefore utilize the nitrogen content of the air for its nitrogen source. Oxygen/nitrogen mixtures other than air are also suitable; and even pure oxygen, or gaseous mixtures containing oxygen without nitrogen, can be used provided that the culture medium contains a fixed nitrogen source as an alternative.

One or more fixed nitrogen sources of conventional type, such as nitrates, ammonium salts, amino-acids or peptone solution, can optionally be added to the culture medium, although this is not strictly necessary when gaseous nitrogen is supplied along with the oxygen, such as in air or similar nitrogen-containing mixtures. On theoretical grounds, it can be expected that more efficient growth is obtainable when a fixed nitrogen source is present, since the energy required by the bacterial cells for nitrogen fixation is derived from the carbon source in the medium. Nevertheless, for practical and economic reasons, it is generally preferred to use air as the nitrogen source.

A monosaccharide, disaccharide or mixture thereof can be used as the carbon source in the culture medium. For example, sucrose is a suitable carbon source, as is glucose, including glucose formed by hydrolysis of starch. Intermediate materials formed during the processing of sugar, for example, molasses or invert sugar, can also be used as the carbon source, provided that they comprise one or more monosaccharides or disaccharides. The culture medium preferably contains about 0.2 – 3 grams of sucrose, or an equivalent amount of other monosaccharide or disaccharide, per 100 ml of water. Carbon source concentrations of about 1 gram or more of sucrose or equivalent per 100 ml of water are preferred for batch processes in the absence of a fixed nitrogen source. However, concentrations outside these ranges can also be used if desired, for example, up to 10 grams of sucrose, or equivalent of other monosaccharide or disaccharide, per 100 ml of water.

The presence of calcium in the culture medium is another important factor in securing good yields of the polysaccharide. It has been found that if no calcium is added very few cells of the micro-organism are produced, although the yield of polysaccharide per cell is high. However, if a calcium source is added, preferably so as to provide a calcium concentration of about 0.02 – 0.6 millimolar in the culture medium, it is possible to obtain good growth of the micro-organism giving useful yields of polysaccharide. Larger or smaller amounts of calcium can be employed, but, in general, no further improvement is obtained with concentrations higher than about 0.6 millimolar. The calcium may be supplied in any form compatible with the medium and effective for assisting growth. For example, about 0.01 – 0.25 gram of calcium chloride, or an equivalent amount of another calcium salt, can be added per 1,000 ml of medium.

The culture medium must also contain sources of potassium, sodium, iron, molybdenum, magnesium and sulfate, which are essential for the proper growth of the micro-organism. The manner in which these elements may be supplied is well known in the art, and they are present in the conventional culture media for *Azotobacter vinelandii* such as Burk's medium. Typically, they may be supplied by the addition to the culture medium of such salts as dipotassium hydrogen phosphate, potassium dihydrogen phosphate, magnesium sulfate, sodium chloride, sodium molybdate and ferrous sulfate.

The cultivation of the micro-organism can be carried out under conventional conditions. The temperature used is normally about 25° – 30°C. Higher or lower temperatures are possible, but above 34°C, the polysaccharide yield generally decreases. The fermentation can be carried out as either a batch or continuous process under submerged conditions in a suitable fermenter. When performed as a batch process, fermentation is normally complete in about 96 hours or less if the various parameters are properly adjusted, although longer times may be required in some cases.

The cells of *Azotobacter vinelandii* used to inoculate the culture medium can be produced by any of the techniques well known in the art. For example, a suitable inoculum can be prepared by incubating the bacteria for 48 hours on agar slopes and then for 24 hours in shake-flasks. The inoculation preferably amounts to 1 – 20% by volume of the fermenter contents. Prior to inoculation with the micro-organism, the culture medium and fermenter must be sterilized, in the conventional manner.

When the process of the invention is used for the production of polysaccharide on a commercial scale, the cultivation of the micro-organism is performed in a fermenter of large capacity, for example, having a volume of about 1,000 liters. The correspondingly large amount of inoculum required for such a fermenter cannot readily be produced by shake-flask culture, and one or more seed fermenters are therefore used. For example, a first seed fermenter of about 5 liters capacity is inoculated with bacteria grown on a solid medium or in shake-flask culture; after a suitable inoculation period, the contents of the first seed fermenter are used to inoculate a second seed fermenter of about 100 liters capacity; after a further suitable period of incubation, the contents of the second seed fermenter are used to provide an inoculum for the final fermenter of about 1,000 liters capacity; and the cultivation is continued in the final fermenter until optimum yield of polysaccharide has been achieved. The culture conditions and composition of the medium used for the earlier fermentation steps may correspond to those already described for the final fermentation. It is also possible to operate these earlier fermentation steps under conventional prior art conditions for the cultivation of *Azotobacter vinelandii*, since it is not necessary to maximize polysaccharide production in the seed fermenters. Nevertheless, it is preferred to operate all the fermentation stages, including the seed fermenters, in accordance with the conditions of the present invention, so that the inoculum used for the final culture medium does not have an undesirably high phosphate concentration or an undesirably low pH.

At the end of the fermentation process, a culture broth containing dissolved polysaccharide is obtained. For some applications of the polysaccharide, it is not necessary to remove the cells of *Azotobacter vinelandii*, in which case the viscous liquid obtained from the fermenter can either be used as it is or it can be spray-dried to a cell-containing powder. On the other hand, if desired, the cells can be removed by conventional means, for example, in a solid-bowl centrifuge or a filter press, and the resulting cell-free polysaccharide solution can also be spray-dried or used as it is. A purer product can be obtained by precipitating the polysaccharide from solution with an alcohol such as isopropanol. Alternatively, an insoluble salt of the polysaccharide can be precipitated by the addition of a suitable reagent, for example, the calcium salt by the addition of calcium chloride solution, and the free acid can be regenerated from the salt by the addition of a stronger acid. Other salts, including soluble salts such as the sodium salt, can be prepared in the conventional manner.

The polysaccharide product obtained by the process of the invention is a partially acetylated variable block copolymer of 1–4 linked *d*-mannuronic and *l*-guluronic acid units, the degree of acetylation normally being approximately 20%. Apart from the acetyl groups, it is chemically similar to alginic acid extracted from seaweed. The bacterial product and its derivatives conform to the standards prescribed for alginic acid and alginates and may be used in the same fields of application, including foodstuffs, pharmaceuticals, and paper and textiles processing.

The invention is further illustrated by the following Examples.

EXAMPLE 1

This Example illustrates the effect on polysaccharide yield of different phosphate concentrations in the culture medium.

Azotobacter vinelandii NCIB 9068 was grown in shake-flasks, in an aqueous culture medium having the composition shown in Table 1.

Table 1

| Ingredient | Composition of culture medium Concentration | |
|---|---|---|
| | Grams/liter | Millimoles/liter |
| Sucrose | 20 | 58 |
| $KH_2PO_4$ | Variable | Variable |
| $K_2HPO_4$ | Variable | Variable |
| $MgSO_4.7H_2O$ | 0.20 | 1.01 |
| NaCl | 0.20 | 3.4 |
| $CaCl_2.6H_2O$ | 0.064 | 0.15 |
| $Na_2MoO_4$ | 0.001 | 0.004 |
| $FeSO_4.7H_2O$ | 0.003 | 0.011 |

The phosphate concentration in the medium used in different shake-flasks was varied from 0.005 to 5.0 millimolar, by appropriate variation of the $KH_2PO_4$ and $K_2PO_4$ amounts added. After the medium was inoculated with the micro-organism which had been grown for 48 hours on agar slopes, the flasks were incubated for 96 hours at 30°C, while being shaken at 200 r.p.m. on an orbital shaker. During the cultivation, the medium was maintained at pH 7.5 by means of tris(hydroxymethyl)aminomethane buffer.

At the end of the 96 hour cultivation period, the polysaccharide yield in each flask was measured by isopropanol precipitation of the culture broth filtrate, followed by dry weight determination.

The results obtained are set out in Table 2 and are shown in graphical form in FIG. 1 of the drawings.

Table 2

Effect on polysaccharide yield of phosphate concentration in culture medium

| Phosphate level (mM $PO_4^\equiv$) | Polysaccharide yield (mg/ml) |
| --- | --- |
| 0.005 | 0.60 |
| 0.025 | 1.45 |
| 0.100 | 2.00 |
| 0.125 | 2.70 |
| 0.200 | 3.05 |
| 0.250 | 3.45 |
| 0.500 | 3.50 |
| 0.750 | 2.40 |
| 0.850 | 2.05 |
| 1.000 | 1.50 |
| 1.250 | 1.15 |
| 2.500 | 0.80 |
| 5.000 | 0.80 |

From Table 2 and the accompanying FIG. 1, it can be seen that improved yields of polysaccharide are obtained at phosphate concentrations of about 0.1 – 0.8 millimolar, in accordance with the present invention. The polysaccharide yield is reduced when operating outside these limits, and the culture medium having a phosphate concentration of 5.0 millimolar produced markedly inferior results. This latter medium had a composition corresponding to that of Burk's medium, conventionally used heretofore for the cultivation of *Azotobacter vinelandii*.

EXAMPLE 2

This Example illustrates the effect on polysaccharide yield of cultivation at various constant pH levels.

*Azotobacter vinelandii* NCIB 9068 was grown in 4 liters of aqueous culture medium having the composition shown in Table 3, in a stirred tank fermenter.

Table 3

Composition of culture medium

| Ingredient | Concentration Grams/liter | Millimoles/liter |
| --- | --- | --- |
| Sucrose | 20 | 58 |
| $KH_2PO_4$ | 0.008 | 0.06 |
| $K_2HPO_4$ | 0.032 | 0.18 |
| $MgSO_4.7H_2O$ | 0.20 | 1.01 |
| NaCl | 0.20 | 3.4 |
| $CaCl_2.6H_2O$ | 0.064 | 0.15 |
| $Na_2MoO_4$ | 0.001 | 0.004 |
| $FeSO_4.7H_2O$ | 0.003 | 0.011 |

The fermenter was fitted with an automatic pH control for metering in 1M NaOH to maintain the pH of the medium at a chosen value, and with an oxygen electrode. The fermenter was sterilized in the usual way prior to the addition of the medium.

To the medium in the fermenter was added an inoculum of 10% by volume of the micro-organism which had been grown for 48 hours on agar slopes and then incubated for 24 hours in shake-flasks. Fermentation was then conducted for 60 hours at 30°C. The medium was kept stirred at 400 r.p.m., and air was bubbled through it at the rate of 1.4 liters per minute. The pH of the medium was kept constant throughout, by the automatic addition of the 1M NaOH solution, as needed.

Separate fermentation runs were performed with the pH of the culture medium maintained at 6, 6.5, 7, 7.3, 7.5, 7.75 and 8. At the end of each run, polysaccharide production was measured by isopropanol precipitation followed by dry weight determination.

The results obtained are set out in Table 4 and are shown graphically in FIG. 2 of the drawings.

Table 4

Effect on polysaccharide yield of culture medium pH

| Culture medium pH | Polysaccharide yield (mg/ml) |
| --- | --- |
| 6.0 | 0 (no growth) |
| 6.5 | 0.8 |
| 7.0 | 1.3 |
| 7.3 | 2.3 |
| 7.5 | 2.7 |
| 7.75 | 2.6 |
| 8.0 | 2.1 |

Table 4 and accompanying FIG. 2 show that improved yields of polysaccharide are obtained when the pH of the culture medium is maintained at values of 7.0 and above, in accordance with the invention. When the pH of the medium was 6.0, no growth of the micro-organism took place.

EXAMPLE 3

This Example demonstrates the improved yield obtained by operating under the conditions of the present invention, as compared with the prior art cultivation conditions.

Three runs were carried out, using the same apparatus, micro-organism, culture medium and procedures as in Example 2, except for the following:

Run A, in accordance with the invention, was performed in a medium having a phosphate concentration of 0.25 millimolar, with the pH kept constant at 7.4;

Run B, for comparative purposes, was performed in a medium having a phosphate concentration of 5.00 millimolar, with the pH kept constant at 7.4;

Run C, for comparative purposes, was also performed in a medium having a phosphate concentration of 5.00 millimolar, but the pH of the medium was not controlled during cultivation, and thus fell from an initial value of 7.4 to 6.4 after 24 hours and to 6.05 after 48 hours.

In each run, the polysaccharide yield was measured after 24 and 48 hours, by the same method as in Example 2.

The results obtained are set out in Table 5.

Table 5

| Run | Culture medium pH | Phosphate level (mM $PO_4^\equiv$) | Polysaccharide yield (mg/ml) 24 Hrs. | 48 Hrs. |
| --- | --- | --- | --- | --- |
| A | Constant: 7.4 | 0.25 | 2.00 | 3.06 |
| B | Constant: 7.4 | 5.00 | 0.40 | 1.10 |
| C | Variable: 7.4 – 6.05 | 5.00 | 0.41 | 0.65 |

These results clearly show that markedly higher polysaccharide yields are obtained under the conditions of low phosphate concentration and pH control, in accordance with the present invention, than under the prior art conditions of high phosphate concentration and falling pH.

I claim:

1. A process for the production of a polysaccharide consisting of a partially acetylated variable block copolymer of 1-4 linked $d$-mannuronic acid and $l$-guluronic acid residues, which process comprises the steps of:
   a. inoculating an aqueous final culture medium with a bacterium of the species *Azotobacter vinelandii*, said medium having a pH in the range of from about 7.0 to about 8.2 and containing as essential ingredients at least one carbon source selected from the group consisting of monosaccharides and disaccharides, at least one phosphate source in an amount such that the concentration of phosphate in the medium is in the range of from about 0.1 to about 0.8 millimolar, and sources of molybdenum, iron, magnesium, potassium, sodium, calcium and sulfate;
   b. cultivating said bacterium in said medium under aerobic conditions, while maintaining the pH of the medium within the range of from about 7.0 to about 8.2, until a substantial formation of polysaccharide has occurred; and
   c. recovering a polysaccharide-containing culture broth.

2. A process according to claim 1, wherein the aqueous final culture medium inoculated with said bacterium contains at least one phosphate source in an amount such that the concentration of phosphate in the medium is in the range of from about 0.2 to about 0.6 millimolar.

3. A process according to claim 1, wherein said bacterium is cultivated in said medium while maintaining the pH of the medium within the range of from about 7.3 to about 7.9.

4. A process according to claim 1, wherein said bacterium is a strain of *Azotobacter vinelandii* selected from the group consisting of strains NCIB 8660, NCIB 8789 and NCIB 9068.

5. A process according to claim 1, wherein the aqueous final culture medium inoculated with said bacterium contains at least one calcium source in an amount such that the concentration of calcium in the medium is in the range of from about 0.02 to about 0.6 millimolar.

6. A process according to claim 1, wherein said culture medium contains at least one carbon source selected from the group consisting of sucrose, glucose, invert sugar and molasses.

7. A process according to claim 1, wherein the cultivation of said bacterium in said medium is performed at a temperature in the range of from about 25°C to about 30°C.

8. In a process for the production of polysaccharide by the aerobic cultivation of a bacterium of the species *Azotobacter vinelandii* in an aqueous culture medium containing as essential ingredients at least one carbon source selected from the group consisting of monosaccharides and disaccharides, and sources of phosphate, molybdenum, iron, magnesium, potassium, sodium, calcium and sulfate, the improvement which comprises providing at least one phosphate source in an amount such that the concentration of phosphate in the medium is in the range of from about 0.1 to about 0.8 millimolar and maintaining the pH of the medium within the range of from about 7.0 to about 8.2.

9. An improved process according to claim 8, wherein the concentration of phosphate in the medium is in the range of from about 0.2 to about 0.6 millimolar.

10. An improved process according to claim 8, wherein the pH of the culture medium is maintained within the range of from about 7.3 to about 7.9.

* * * * *